United States Patent [19]

Fisher et al.

[11] 4,405,647
[45] Sep. 20, 1983

[54] METHOD OF COMPACTING CHEWING GUM BASE

[75] Inventors: E. Eugene Fisher, Elgin; R. Ray Estes, Downers Grove, both of Ill.; Orrin D. Lokken; Elmer G. Paguette, both of Madison, Wis.

[73] Assignee: Wm. Wrigley Jr. Company, Chicago, Ill.

[21] Appl. No.: 273,361

[22] Filed: Jun. 15, 1981

[51] Int. Cl.$^3$ .............................................. A23G 3/30
[52] U.S. Cl. .......................................... 426/4; 426/5; 426/454; 426/294; 426/295
[58] Field of Search ................................ 426/96, 3-6, 426/518, 473, 453, 294, 295

[56] References Cited

U.S. PATENT DOCUMENTS

| | | | |
|---|---|---|---|
| 658,248 | 9/1900 | Dunn | 426/454 |
| 1,333,967 | 3/1920 | Fowler et al. | 426/473 |
| 1,374,160 | 4/1921 | Fowler et al. | 426/473 |
| 2,290,120 | 7/1942 | Thomas | 426/3 |
| 3,036,533 | 5/1962 | Burt et al. | 426/294 |
| 3,356,509 | 12/1967 | Loval, Jr. | 426/294 |
| 4,081,558 | 3/1978 | Grylls | 426/473 |

Primary Examiner—Jeanette M. Hunter
Attorney, Agent, or Firm—McCaleb, Lucas & Brugman

[57] ABSTRACT

A tacky substance such as a chewing gum base is formed into a compact body. The tacky substance is first comminuted within a bed consisting of a powdered solid, such as a bulking agent, turbulently suspended within a gaseous medium at room temperature. The tacky substance is subjected to repeated mechanical impact within the powdered solid to pulverize it into particles which are then immediately coated by the powdered solid in order to prevent cohesion between the particles. The coated particles are classified to identify those suitable for tableting and the suitable particles are then fed into a tablet press to form a compact body.

17 Claims, 5 Drawing Figures

METHOD OF COMPACTING CHEWING GUM BASE

BACKGROUND OF THE INVENTION

1. Field of the Invention

This invention relates in general to a method of comminuting and then tableting a tacky substance, such as a chewing gum base, in order to form a compact body.

2. Description of the Prior Art

Prior known methods of compacting tacky substances, including solids and viscous liquids not directly tabletable because of their tackiness, require special preparation to allow pulverizing or comminuting the tacky substance. For example, U.S. Pat. No. 2,290,120, which issued July 14, 1942, discloses the preparation of a chewing gum product requiring refrigeration or freezing of the chewing gum base in order to render it relatively rigid to permit comminution to particles of a desired size. This pulverization step can also be accomplished by introducing hydrolyzable components into polymer chains and then hydrolyzing to cause disintegration of the large molecules.

However, none of the prior known methods is well-adapted to convenient or economical mass production of compacted products.

SUMMARY OF THE INVENTION

In general, the present invention provides a simple and economical method of compacting tacky substances which are not directly tabletable. According to the present invention, a tacky substance is comminuted within a fluidized bed consisting of a powdered solid turbulently suspended within a gaseous medium, preferably at room temperature. The tacky substance is subjected to repeated mechanical impact within the powdered solid to pulverize it into particles which are then immediately coated by the powdered solid in order to prevent cohesion between the particles. Coated particles are periodically classified to identify those suitable for tableting. Finally, the suitable coated particles are tableted to form a compact body.

Accordingly, it is an object of the present invention to conveniently and economically form non-tacky tabletable granulates from tacky substances.

Another object of the present invention is to economically produce chewing gum using conventional tableting machinery.

Other objects and advantages of the present invention will become apparent from the following description, which discloses a preferred method.

DESCRIPTION OF THE PREFERRED METHOD

Figure 1:
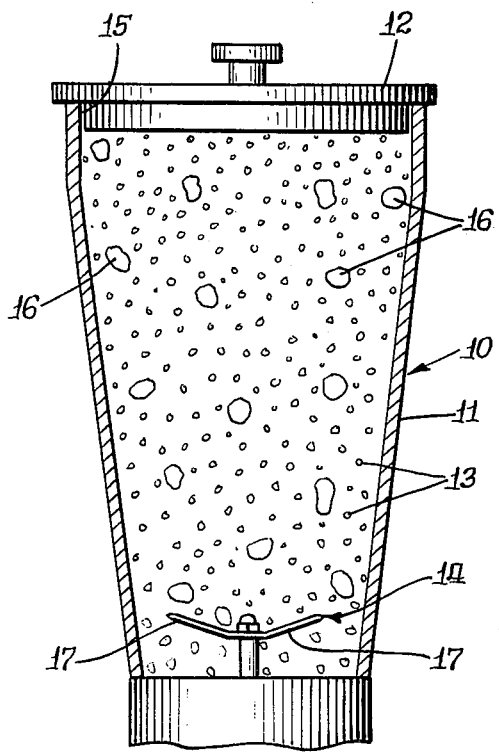
FIG. 1 is a side elevational view, with parts broken away and parts in section, of a blending apparatus employed in the preferred method of the present invention.

In general, according to the preferred method of the present invention, a fluidized bed consisting of a finely divided or powdered solid, turbulently suspended within a gaseous medium preferably at room temperature, is conveniently provided through use of a conventional blending apparatus, a hammermill or an "Osterizer" blender, which are all well-known in the art. The solid comprises an ultimately edible substance such as a low molecular carbohydrate having less than 20 carbon atoms, a corresponding alcohol, a bulking agent or other physiologically inert substance, but preferably consists of xylitol, mannitol, a polymer of glucose or sorbitol. The gaseous medium is an inert gas such as air or nitrogen.

A tacky substance processed in accordance with the present invention is any masticatory solid or viscous liquid not directly tabletable because of its tackiness; a list of tacky substances appears in Title 21 of the U.S. Code of Federal Regulations at Section 121.1059. The tacky substance is introduced, preferably in pellet form, into the fluidized bed for comminution. The pellets are broken up by repeated impact with the powder-coated, rapidly-rotating blades of the blending apparatus and, to a certain extent, by the powdered solid itself to produce progressively smaller particles. The powdered solid particles adhere to and coat the tacky substance particles immediately upon their formation in order to prevent cohesion between the tacky substance particles and, in addition, adhesion between those particles and the walls of the blending apparatus.

The coated particles of tacky substance are periodically classified, preferably by sifting or sieving, to identify those sizes which are suitable for tableting. The coated particles may be further classified to determine which fractions are readily flowable in a commercially available tablet press or other continuous compressing means. The selected particles are then tableted in a known manner to form a compact body. The method of the present invention is well-suited for economical mass production of compact articles.

The strikingly instantaneous attraction of the fluidized powder particles to the newly formed surfaces of the tacky substance particles is partially explained by the substantial difference in surface energies of the particles. A chewing gum base particle has a low surface energy, typical of hydrocarbon systems, in the range of 20 ergs per square centimeter. A fluid bed particle has a higher surface energy, preferably above 30 ergs per square centimeter. Typically, a fluid bed carbohydrate particle has a surface energy in the range of 40 to 50 ergs per square centimeter while a clay particle has an even higher surface energy in the 100 ergs per square centimeter range. The difference in surface energies between the tacky substance particles and the fluid bed particles, along with electrostatic charges, contribute to the attraction between these particles to establish a resultant combination with a stabilized, equalized surface energy value.

With specific reference to the drawings, reference numeral 10 in FIG. 1 generally indicates a known blending means, such as a commercially available Osterizer blender, for the powdered fluidized bed. The blending apparatus has an outer shell 11 and a top cover 12 for containment of the finely divided, powdered solid particles indicated by reference numeral 13. A rapidly revolving chopper blade 14 rotates at speeds up to approximately 17,000 rpm in order to maintain the fine powder particles 13 suspended and fluidized in the gaseous medium, preferably air, within the blending means. The top cover 12 is further equipped with a normally covered opening 15 for introduction of charging materials into the blender.

Figure 2:
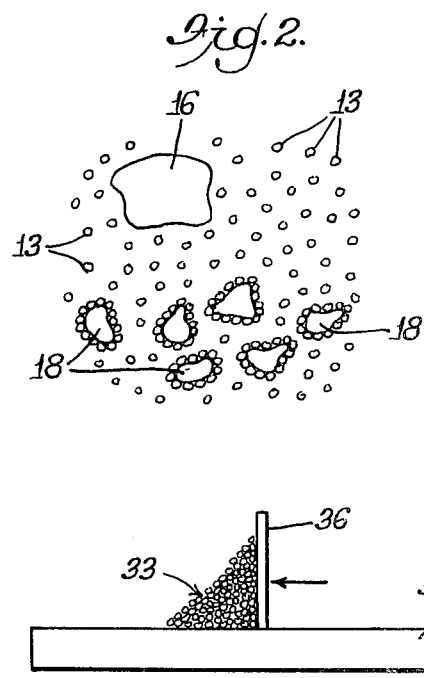
FIG. 2 is a schematic illustration of particles of the turbulently suspended powdered solid and the tacky substance which are contained within the blending apparatus illustrated in FIG. 1.

The tacky substances to be prepared for tableting is introduced through opening 15 into the processing Osterizer blender 10 in relatively large pieces or pellets indicated by reference numeral 16 in FIGS. 1 and 2. The pellets 16 are rapidly cut up by impact with the rotating surfaces 17 of the chopper blade 14. The pellets 16 are also subjected to repetitive impacts by the turbulently agitated fine powder particles 13 whirled about the interior of the blending means 10 in a fluidized state. As the tacky substance pellets 16 are disintegrated into smaller particles 18 (FIG. 2), the particles 18 are instantly coated by the fine powder particles 13 in order to prevent cohesion between the particles 18 themselves or adhesion with the Osterizer blender 10.

Figure 3:
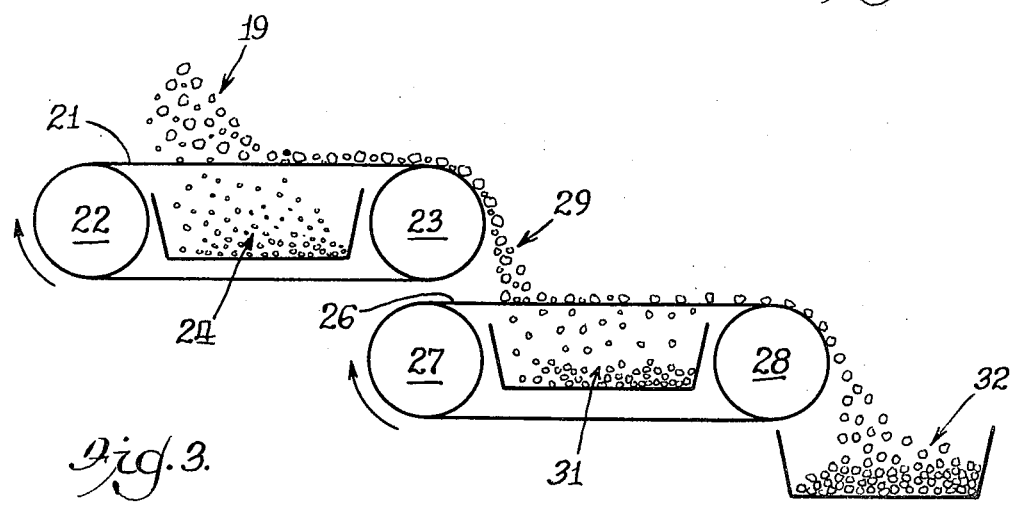
FIG. 3 is a schematic illustration of a vibrating belt sieving system used in the preferred method of the present invention for classifying coated particles of the tacky substance.

As the tacky substance particles 16 are comminuted and coated in this manner, the resultant material within the blending apparatus 10 becomes non-uniform in size. In order to obtain coated particles of sizes suitable for tableting, the resultant material is periodically fed to a known vibrating screen belt schematically illustrated in FIG. 3. The resultant material, generally illustrated by reference numeral 19 in that figure, is periodically removed from the blender 10 and is then deposited on a vibrating screen belt 21, trained for orbited movement about pulleys 22 and 23, for isolation of particles 24, which are too fine for tableting. A second vibrating screen belt 26, trained for orbital movement about pulleys 27 and 28, receives the material 29 from belt 21 to separate a second, coarser fraction of particles 31 which are of sizes suitable for tableting in conventional tableting machinery (not shown). The still coarser material 32, which is not isolated by belts 21 or 26, is collected for reprocessing. Alterntively, the non-uniform material from the blending apparatus 10 may be classified using a conventional sieving apparatus such as a vertical stack of vibrating screens of progressively increasing mesh sizes or a rotating screen drum (not shown) or other types of centrifugal or air sifting devices.

Figure 4:
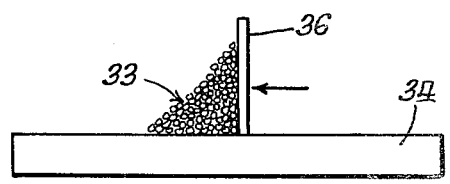
FIGS. 4 and 5 are side elevational views illustrating a simple test procedure for identifying coated particle sizes which are readily flowable in tableting machinery.
Figure 5:
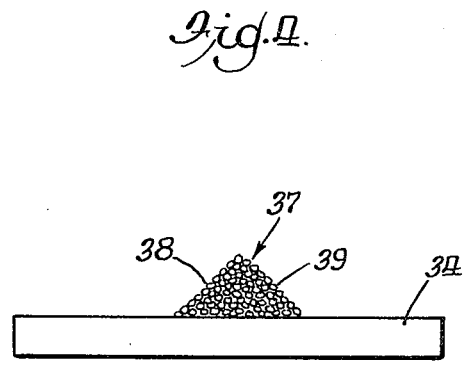

FIGS. 4 and 5 illustrate a simple test procedure found useful for determining which fractions of the material from the blender 10 are readily flowable in conventional tableting apparatus, the flowable material providing better tablets than non-flowable material. In this test, a heap of material 33 is placed on a plate 34 (FIG. 4) and the heap is pushed with a blade 36 so that the material piles up against the blade. When the blade is removed, if the frictional and dimensional characteristics of the material are ideally suitable for tableting, the material will flow back substantially evenly to form a pile 37 (FIG. 5) with similar slopes 38, 39 on each side. Material passing this test is referred to as "noncaking" material.

The present invention is further illustrated by the following examples in which the proportions are indicated in parts by weight (hereinafter "pbw").

EXAMPLE NO. 1

155 pbw of powdered sucrose was placed in the blender and fluidized. 60 pbw of adhesive chewing gum base which does not markedly adhere to tooth and denture surfaces, such as disclosed in U.S. Pat. No. 3,984,574, issued Oct. 5, 1976, was then added, approximately 10 pbw at a time. The total blending time was 2½ minutes. The mixture was then screened through a No. 20 mesh screen to recover the excess sucrose, leaving granules on the screen for further processing.

Next, 70 pbw of tableting grade sucrose, commercially identified as "DiPac," and 10 pbw of water were first blended in a Hobart mixer with a wire whip. The granules left on the No. 20 mesh screen were then added to the Hobart mixer. Toward the end of the mixing period, 2 pbw of magnesium stearate was added as a lubricant for tableting.

The granulation from the Hobart mixer was then screened progressively first through a 20 mesh screen and then through a 12 mesh screen. The part retained on the 12 mesh screen was dried and readily tableted in a conventional manner.

The tablets had a mottled appearance because the sucrose coating became perforated during tableting. Smaller granules would reduce this effect and provide a more uniform appearance. The tablets were hard with shiny surfaces and were pleasant to chew.

EXAMPLE NO. 2

5 pbw collidal silica (the commercially available Cabot brand "Cab-O-Sil") and 3 pbw powdered xylitol were placed in an Osterizer blender set at a speed sufficient to maintain the bed in a fluidized condition. The Osterizer blender speed necessary to maintain the bed fluidized will vary with the density and the surface area of the finely divided powder, as will be apparent to those skilled in the art. 50 pbw chewing gum base identified in Example No. 1 was added in small increments while maintaining the Osterizer blender at about 17,000 rpm. The grinding time was 1½ minutes.

The base was sieved to a desired particle size remaining on a 20 mesh screen and the oversized particles were recycled. 47 pbw of the fraction representing the 20 mesh size was then added to a slurry of 47 pbw of powdered xylitol. Next, 6 pbw of water was added and mixed to coat the particles. Finally, 2 pbw of magnesium stearate tableting lubricant was added. The final mixture was then dried and tableted by conventional methods.

A chewing gum made by tableting the above final mixture provides a quick burst of cooling sensation which is pleasant to taste. The base coalesces nicely into a chewable mass.

EXAMPLE NO. 3

150 pbw powdered xylitol and 3 pbw calcium carbonate were used to form a fluid bed in the manner described in Example No. 2. 50 pbw of chewing gum base identified in Example No. 1 was then added. Granules obtained in a manner similar to that described in Example No. 2 were tableted to form a pleasant and tasty chewing gum product.

EXAMPLE NO. 4

3 pbw "Cab-O-Sil" colloidal silica constituted the fluid bed. 50 pbw chewing gum base identical to that used in Example No. 1 was added gradually during a period of 1½ minutes while the blender was running. The product obtained was then granulated by normal methods after adding syrup, sugars, softeners and flavors as required to achieve the desired texture and flavor in the tabletable granulation. Tableting of this granulation was accomplished by conventional methods. A tableting aid (talcum powder) for a punch lubricant was incorporated in the granulation.

EXAMPLE NO. 5

50 pbw colloidal Koalin and 3 pbw of cornstarch provided the fluidized bed for grinding the chewing gum base.

After 50 pbw chewing gum base was added to the fluidized bed for comminution, sieving was accomplished with a rotary screen sieving apparatus to isolate the desired fraction. In this example, 20 pbw of the granules on a 50 mesh screen was added to a syrup of 70 pbw molten xylitol. To this mix was added 10 pbw of powdered xylitol. Upon cooling, granules were formed which, when dried, were tableted using a conventional tableting apparatus. 2 pbw of cornstrach was added as a tableting aid late in the granulating step.

The tablets, which were pleasant to chew, could be coated by pre-compression, pan-coating or by other conventional means if a coated appearance is preferred.

EXAMPLE NO. 6

15 pbw cornstrach was placed in the Osterizer blender and fluidized by adjusting the speed of the chopper blade 14. 50 pbw chewing gum base was then gradually added to the fluid bed grinder through the opening 15 (FIG. 1) in the top cover. The grinding of the base upon impacting yielded particles of chewing gum base with a thin coating of the starch fluid bed material, this coating rendering the chewing gum base substantially non-tacky and tabletable by a conventional tableting apparatus to permit formation of a commercially acceptable chewing gum product containing desired sweeteners, softeners and flavors.

EXAMPLE NO. 7

A fluidized bed was established using 90 pbw of a finely comminuted calcium carbonate. 15 pbw of a viscous liquid polymer identified as Shell Catalog No. 815 Epon resin was introduced into the fluid bed. While adjusting the speed of the chopper blade 14 to maintain fluidity of the bed, the resin was ground for one minute. The resultant granules were substantially non-tacky and could be tableted.

EXAMPLE NO. 8

A fluid bed of 5 pbw of "Cab-O-Sil" silica was established. To this was added was added 15 pbw of Shell Catalog No. 815 Epon resin. Running chopper blade 14 to maintain the bed in a fluid condition yielded semi-tacky granules for use as such or for further compounding into other products.

EXAMPLE NO. 9

A fluid bed of 100 pbw powdered zylitol was established in the blender. 20 pbw of honey was added. Operation of chopper blade 14 followed by sieving to appropriate particle size produced a relatively non-tacky substance. Upon compression, the xylitol coating on the honey particles ruptured to render a very soft and pliable tablet. The granules of coated honey can be added to other preparations or chewed as produced.

EXAMPLE NO. 10

The chewing gum base identified in Example No. 1 was formed into pellets, which were melted at temperature above the base softening point until the base pellets became uniformly soft and flowable. This molten base was added to a fluid bed of powdered xylitol to be cooled and ground up with the base. After less than a minute of grinding in the fluid bed by chopper blade 14, a calcium carbonate tableting aid was added. Upon cooling and sieving to appropriate particle size, a granular product was obtained which, when fed to a tableting press, resulted in tablets of slightly mottled appearance. This product had a pleasant texture and was receptive to usual flavors, colors and softeners.

EXAMPLE NO. 11

A fluid bed comprising 150 pbw of powdered sucrose was established in the blender 10. To this was added corn syrup consisting of 39 pbw dextrose equivalent and 15.0% water. The speed of the blender blade 14 was adjusted to maintain the fluid bed. After cooling and sieving, irregular non-tacky granules resulted. The desired sieve fraction of these granules yielded a hard, non-tacky tablet.

The embodiments of the invention in which an exclusive property or privilege is claimed are defined as follows:

1. A method of compacting chewing gum base comprising the steps of:
    providing a fluidized bed consisting of a powdered solid turbulently suspended within a gaseous medium, the weight ratio of said powdered solid to said gum base being at least two to one;
    comminuting said gum base into particles within said bed, said powdered solid serving to coat said particles to prevent cohesion therebetween;
    periodically classifying said coated particles to identify sizes thereof suitable for tableting; and
    tableting said identified particles to form a compact body.

2. The method of claim 1 wherein said powdered solid is turbulently suspended within a gaseous medium at room temerature.

3. The method of claim 1 and the additional step of periodically classifying said coated particles to identify fractions thereof which are readily flowable in a tableting means.

4. The method of claim 1 and the additional step of breaking up said tacky substance into pellets prior to comminution within said bed.

5. The method of claim 1 wherein said powdered solid is turbulently agitated within a blending means, said blending means having a rapidly rotatable blade operable to disintegrate said tacky substance.

6. The method of claim 1 wherein said gaseous medium is an inert gas.

7. The method of claim 1 wherein said coated particles are classified by sifting to identify sizes thereof suitable for tableting.

8. The method of claim 1 wherein said coated particles are classified by sieving to identify sizes thereof suitable for tableting.

9. The method of claim 1 wherein said tacky substance is a chewing gum base.

10. The method of claim 1 wherein said solid is an edible substance.

11. The method of claim 10 wherein said solid is a carbohydrate derivative having less than 20 carbon atoms.

12. The method of claim 10 wherein said solid is selected from the group consisting of low molecular carbohydrates and carbohydrate alcohols.

13. The method of claim 10 wherein said solid consists essentially of xylitol.

14. The method of claim 10 wherein said solid consists essentially of mannitol.

15. The method of claim 10 wherein said solid consists essentially of a polymer of glucose.

16. The method of claim 10 wherein said solid consists essentially of sorbitol.

17. The method of claim 1 wherein said tacky substance and said solid have substantially different surface energies.

* * * * *

UNITED STATES PATENT AND TRADEMARK OFFICE
CERTIFICATE OF CORRECTION

PATENT NO. : 4,405,647

DATED : September 20, 1983

INVENTOR(S) : E. Eugene Fisher, et al.

It is certified that error appears in the above—identified patent and that said Letters Patent is hereby corrected as shown below:

Under Inventors "Elmer G. Paguette"
    should be --Elmer G. Paquette--

Under References Cited "Loval, Jr."
    should be --Laval, Jr.--

Col. 5, line 48, delete "was added"
    [second occurrence]

Signed and Sealed this

Ninth Day of October 1984

[SEAL]

Attest:

Attesting Officer

GERALD J. MOSSINGHOFF

Commissioner of Patents and Trademarks